2,909,554
PROCESS FOR THE MANUFACTURE OF (ALKYL-MERCAPTO) ALKYL SULFATES

Edward L. Doerr, Dayton, Ohio, assignor to Monsanto Chemical Company, St. Louis, Mo., a corporation of Delaware No Drawing. Application July 23, 1956
Serial No. 599,350

4 Claims. (Cl. 260—458)

The present invention relates to surface active agents and more particularly provides certain new and valuable alkylmercaptoalkyl sulfate salts and the method of producing the same.

According to the invention 2-(alkylmercapto)ethanols having from 8 to 18 carbon atoms in the alkyl radical are reacted with chlorosulfonic acid to give the corresponding 2-(alkylmercapto)ethyl mono-acid sulfate, and the acid sulfate is neutralized with an alkali metal or ammonium hydroxide to give the alkali metal or ammonium 2-(alkylmercapto)ethyl sulfate substantially according to the scheme:

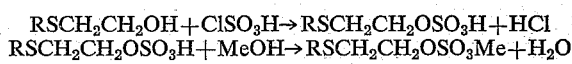

$$RSCH_2CH_2OH + ClSO_3H \rightarrow RSCH_2CH_2OSO_3H + HCl$$
$$RSCH_2CH_2OSO_3H + MeOH \rightarrow RSCH_2CH_2OSO_3Me + H_2O$$

wherein R is an alkyl radical of from 8 to 18 carbon atoms and Me is an anion selected from the class consisting of alkali metal and ammonium.

2-(alkylmercapto)ethanols suitable for the present purpose are 2-(n-octylmercapto)ethanol, 2-(ethylhexylmercapto)ethanol, 2-(n-nonylmercapto)ethanol, 2-(n-decylmercapto)ethanol, 2-(n-undecylmercapto)ethanol, 2-(2-butyloctylmercapto)ethanol, 2-(5-ethylnonylmercapto)ethanol, 2-(2,6,8-trimethyl-4-nonylmercapto)ethanol, 2-(n-dodecylmercapto)ethanol, 2-(2-n-propylheptylmercapto)ethanol, 2-(n-tridecylmercapto)ethanol, 2-(7-ethyl-2-methylundecylmercapto)ethanol, 2-(n-tetradecylmercapto)ethanol, 2-(n-pentadecylmercapto)ethanol, 2-(n-hexadecylmercapto)ethanol, 2-(n-octadecylmercapto)-ethanol, etc.

Either the alkali metal hydroxides, i.e., sodium, potassium or lithium hydroxide or ammonium hydroxide are used to neutralize the 2-(alkylmercapto)ethyl mono-acid sulfates obtained by the condensation of chlorosulfonic acid with the 2-alkylmercapto)ethanols. Examples of the presently useful 2-(alkylmercapto)ethyl sulfate salts thus obtained include sodium 2-(tertoctylmercapto)ethyl sulfate, ammonium 2-(2-ethylhexylmercapto)ethyl sulfate, potassium 2-(branched chain nonylmercapto)ethyl sulfate, lithium 2-(n-decylmercapto)ethyl sulfate, sodium 2-(5-ethylnonylmercapto)ethyl sulfate, sodium 2-(2-n-propylheptylmercapto)ethyl sulfate, potassium 2-(2-butyloctylmercapto)ethyl sulfate, potassium 2-(2-ethyl-7-methylundecylmercapto)ethyl sulfate, ammonium 2-(n-tetradecylmercapto)ethyl sulfate, sodium 2-(n-octadecylmercapto)ethyl sulfate, etc.

Reaction of the 2-(alkylmercapto)ethanol with the chlorosulfonic acid takes place readily by contacting the reactants in the presence of ether as diluent. Before neutralizing the mono-acid 2-(alkylmercapto)ethyl sulfate which is formed by reacting the 2-(alkylmercapto)ethanol with the chlorosulfonic acid as shown in the above reaction scheme, it is advantageous, but not necessary, substantially to separate the diluent from the reaction mixture, e.g., by distillation. The residue, which comprises the mono-acid 2-(alkylmercapto)ethyl sulfate and by-product hydrogen chloride is neutralized by treatment with sodium, potassium, lithium or ammonium hydroxide, depending upon the 2-(alkylmercapto)ethyl sulfate salt which is desired. In order to facilitate removal of the by-product alkali metal or ammonium chloride formed by neutralization of the by-product hydrogen chloride, the neutralizing step may be conducted in the presence of an organic diluent in which the by-product salt is insoluble. This by-product, however, may be separated by other isolating procedures known to the art.

Generally, the product obtained after stripping of diluent and separation of the by-product salt consists essentially of the 2-(alkylmercapto)ethyl sulfate salt, particularly when the 2-(alkylmercapto)ethanol and the chlorosulfonic acid have been employed in substantially equimolar proportions. The 2-(alkylmercapto)ethyl sulfate salt thus obtained may be employed directly as a surfactant. However, if desired, a purer product can be obtained by repeated washing with an organic solvent such as ethanol or isopropanol in order to remove any unreacted initial alcohol and to precipitate out any residual by-product salt. The crude product may also be purified by recrystallization, e.g., from a hot organic solvent or by dissolution and concentration.

Since one mole of chlorosulfonic acid is needed to react with one mole of the 2-(alkylmercapto)ethanol in order to give the mono-acid 2-(alkylmercapto)ethyl sulfate, these reactants are advantageously used in such proportions. However, an excess of either reactant may be used, said excess being separable from the reaction prior to or during the neutralization and isolation steps.

The alkali metal or ammonium 2-(alkylmercapto)ethyl sulfates prepared according to the invention are stable, well characterized products which may be used for a variety of industrial and agricultural purposes, e.g., as emulsifying, wetting-out and detersive agents and as nematocides and fungicides. The present sulfates are distinguished particularly by very good detersive, wetting-out and lathering properties, particularly in hard water and water containing dish-washing soils. They are thus eminently suitable as the active ingredients of detersive compositions for either mechanical or hand dish-washing purposes.

The invention is further illustrated, but not limited, by the following examples:

Example 1

A sulfation mixture was prepared by adding drop-wise, with ice cooling, 34.2 g. of chlorosulfonic acid to 60 ml. of ether. This mixture was then added during 9 minutes at a temperature of 2–5° C. to a solution consisting of 61.6 g. of n-dodecylmercaptoethanol dissolved in approximately 500 ml. of ether. After stirring the whole on an ice-bath for 30 minutes the ether was stripped off under vacuum and the residue neutralized by pouring it into 50% aqueous ethanol solution of sodium hydroxide. Excess ethanol was added to the neutralized product, and the whole was heated to 50° C. and then filtered to remove inorganic salts. The solid which crystallized from the cooled filtrate was filtered off and vacuum dried at room temperature. It was then purified by treating it with acetone in a Waring Blendor, and filtering and washing the solid on the filter with fresh acetone. After vacuum drying the washed solid at room temperatures there was obtained the substantially pure n-dodecylmercaptoethyl sulfate analyzing as follows:

|  | Found | Calcd. for $C_{14}H_{29}NaO_4S_2$ |
| --- | --- | --- |
| Percent C | 47.22 | 48.25 |
| Percent H | 8.46 | 8.39 |
| Percent S | 18.06 | 18.40 |

Example 2

To a solution of 94.9 g. (0.4 mole) of 2-(tert-dodecylmercapto)ethanol in 500 ml. of ether there was added through a dropping funnel a sulfation mixture which had been prepared by adding drop-wise with cooling 52.5 g. (0.44 mole based on 98% assay) of chlorosulfonic acid to 75 ml. of ether. Addition of said mixture was conducted during 15 minutes at a temperature of 2–5° C. and the resulting reaction mixture was then stirred for 30 minutes at a temperature of 2° C. After stripping off the ether from the reaction mixture the residue was poured slowly into an aqueous isopropanol solution of sodium hydroxide in order to neutralize it. The inorganic salts which precipitated out after adding an excess of isopropanol to the neutralized product were filtered off and the solvent was stripped off the filtrate under reduced pressure. The residue thus obtained comprised the substantially pure sodium 2-(tert-dodecylmercapto)ethyl sulfate.

Example 3

To a one-liter reactor fitted with a glass paddle stirrer, thermometer, drying tube and dropping funnel there was charged 73.4 g. (0.25 mole) of 2-(tert-hexadecylmercapto)ethanol and approximately 500 ml. of ether. There was then added to the resulting solution during 12 minutes at a temperature of 2–5% C. a sulfation mixture which had been prepared by dropping 34.2 g. (0.29 mole) of chlorosulfonic acid to 60 ml. of ether with ice cooling. After addition of the mixture had been completed the whole was stirred for 30 minutes at a temperature of 2° C. Ether was then removed at reduced pressure and the residue was slowly poured into an ice cooled aqueous ethanol solution of sodium hydroxide, the pH being adjusted to keep the reaction mixture slightly alkaline during this step. An insoluble oil which was observed after the neutralizing step was removed after settling in a separatory funnel. The 4.2 g. of oil was discarded and the remainder of the reaction mixture was treated with an excess of ethanol. The inorganic salts which were thus precipitated were removed and the solvent was stripped from the residue under reduced pressure. The stripped residue was washed with acetone and the washed product dried under water pump vacuum to give the substantially pure sodium 2-(tert-hexadecylmercapto)ethyl sulfate.

Example 4

This example describes evaluation of the 2-(n-dodecylmercapto)ethyl sulfate of Example 1 as a dishwashing detergent. It has been shown by Weeks, Harris and Brown in the Journal of The American Oil Chemists Society 31 254–257 (1954), that a dynamic testing of foam stability gives good correlation with practical plate wash tests in 300 p.p.m. hard water. Accordingly, in the present instance there was employed a dynamic foam test which consisted of:

(1) Stirring the detergent solution under controlled conditions to build up foam.

(2) Adding increments of soil followed by stirring until the foam value is finally reduced to a minimum.

The synthetic dish-washing soil which was used in the present test had the following composition:

|  | Percent |
|---|---|
| Edible tallow | 25 |
| Mazola oil (vegetable oil) | 25 |
| Crisco (hydrogenated higher fatty acid glycerides) | 24 |
| White wheat flour | 25 |
| Oleic acid | 1 |
| Calcofluor white fluorescent dye as tracer | 0.03 |

The following equipment was used:

The stirring motor was a 110 volt stirrer which was fitted with a 1.04 amp. constant voltage transformer and a Variac for maintenance of constant speed. In the present test a speed of 3000±50 r.p.m. was used.

The graduated cylinder in which the foam was produced was a 1000 ml. size cylinder which had been cut off at the 600 ml. mark. It had an inside diameter of 6 cm. and a height of 21 cm. from the 0 to 600 ml. mark.

The stirring propellor was dual bladed and had a combined blade length of 1.75 inches.

Air and water baths were provided by immersing an empty 3000 ml. beaker in water maintained at 25° C. and centering said graduated cylinder in said beaker.

Testing was conducted as follows: The 2-(n-dodecylmercapto)ethyl sulfate of Example 1 was added to 300 p.p.m. hardness water to give a concentration of 0.10% of said sulfate in the water. A 100 ml. sample of the resulting solution was transferred to the graduated cylinder which had been suspended in the beaker. This arrangement allowed the test solution to cool at a rate similar to that in practical dish-washing. The stirrer was then lowered into the graduated cylinder to a position 13 mm. above the inside bottom of the cylinder. At the end of one minute the stirrer was started and stirring was continued for 120 seconds. The solution was then allowed to rest for 30 seconds, at the end of which time the foam value in ml. above the 100 ml. mark was recorded. A reading of 210 ml. was thus obtained. A 0.125 gram portion of the soil described above was then added to the test sample, the whole was stirred for 60 seconds, and then allowed to rest for 60 seconds. The foam volume above the 100 ml. mark at the end of this time was found to be 200 ml., which value shows very good foam stability of the presently tested sulfate against the synthetic dish-washing soil.

What I claim is:

1. The method which comprises contacting a 2-(alkylmercapto)ethanol having from 8 to 18 carbon atoms in the alkyl radical with chlorosulfonic acid in ether at a temperature of from 0° C. to 10° C., substantially separating the ether from the resulting reaction product to obtain a residue, neutralizing the residue with an alkali metal hydroxide, and recovering from the neutralized product an alkali metal 2-(alkylmercapto)ethyl sulfate wherein the alkyl radical is as herein defined.

2. The method which comprises contacting 2-(n-dodecylmercapto)ethanol with chlorosulfonic acid in ether at a temperature of from 0° C. to 10° C., substantially separating the ether from the resulting reaction product to obtain a residue, neutralizing the residue with sodium hydroxide, and recovering sodium 2-(n-dodecylmercapto)ethyl sulfate from the neutralized residue.

3. The method which comprises contacting 2-(tert-dodecylmercapto)ethanol with chlorosulfonic acid in ether at a temperature of from 0° C. to 10° C., substantially separating the ether from the resulting reaction product to obtain a residue, neutralizing the residue with sodium hydroxide, and recovering sodium 2-(tert-dodecylmercapto)ethyl sulfate from the neutralized residue.

4. The method which comprises contacting 2-(tert-hexadecylmercapto)ethanol with chlorosulfonic acid in ether at a temperature of from 0° C. to 10° C., substantially separating the ether from the resulting reaction product to obtain a residue, neutralizing the residue with sodium hydroxide, and recovering sodium 2-(tert-hexadecylmercapto)ethyl sulfate from the neutralized residue.

References Cited in the file of this patent

UNITED STATES PATENTS

| 2,100,297 | Baldwin et al. | Nov. 23, 1937 |
| 2,570,050 | Eby | Oct. 2, 1951 |
| 2,630,449 | Blake | Mar. 3, 1953 |
| 2,653,978 | Doerr | Sept. 29, 1953 |